(12) United States Patent
Simske et al.

(10) Patent No.: US 6,263,122 B1
(45) Date of Patent: Jul. 17, 2001

(54) SYSTEM AND METHOD FOR MANIPULATING REGIONS IN A SCANNED IMAGE

(75) Inventors: Steven J. Simske; Jeffrey P. Lee, both of Greeley, CO (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/159,147

(22) Filed: Sep. 23, 1998

(51) Int. Cl.[7] .................................................. G06K 9/03
(52) U.S. Cl. ............................................................ 382/311
(58) Field of Search .................................. 382/311, 310, 382/312, 313, 314, 315, 190, 191, 173, 176, 180, 282, 309; 358/453, 464, 462

(56) References Cited

U.S. PATENT DOCUMENTS 5,048,096 * 9/1991 Beato ........................................ 382/9
5,048,109 * 9/1991 Bloomberg et al. ................... 382/50
5,809,167 * 9/1998 Al-Hussein ........................... 382/190

* cited by examiner

Primary Examiner—Andrew W. Johns
Assistant Examiner—Seyed Azarian

(57) ABSTRACT

Scanned region type sensitivity logic and scanned region clustering/declustering logic allow the manipulation of regions within a scanned image. A scanned region type sensitivity logic allows the manipulation of region type attributes by allowing a user of a scanner product, through the use of a user interface, to adjust the sensitivity of a particular region type in real time, with the results of the adjustment displayed back to the user through the user interface. A scanned region clustering/declustering logic allows a user of a scanner product, through the use of a user interface, to manipulate the grouping of regions displayed to the user in real time. Both of these forms of scanning logic are predicated on the underlying use of a document analysis technology that stores probabilities ("p-values") or other relative statistics on all plausible region types as part of the definition of the regions.

8 Claims, 16 Drawing Sheets

SYSTEM AND METHOD FOR MANIPULATING REGIONS IN A SCANNED IMAGE

BACKGROUND OF THE INVENTION

1. Field of the Invention

The present invention relates generally to electronic scanning devices, and, more particularly, to a system and method for manipulating regions in a scanned image.

2. Related Art

Scanning devices are useful in many applications where it is desirable to transfer an image from printed form into electronic form. Scanners capable of reading and converting a page into electronic format have been available for quite some time. Typically, a scanner will electronically read a page, classify the different types of images on the page and electronically store the information for later presentation and use. The types of classifications of a scanned page typically include text, photographs, drawings, charts, tables, business graphics, equations, handwriting, logos, etc. These different parts of a scanned image are typically classified into regions by a user after the scanner has scanned the page. Some scanners are capable of determining the classifications of particular regions of a scanned page in accordance with predetermined instructions.

For example, in a page including text and drawings, some scanners will scan the page and will classify and store the text information as a text region and will classify and store the drawing information as a drawing region, and so on. Unfortunately, it is possible for the scanner to interpret some regions in a manner different from that which a user desires. Multiple interpretations of the same scanned information are possible regarding the attributes of a scanned image that should be presented to a user. For example, a scanner, or more properly the scanner analysis code, might classify a particular section of text (e.g., a large capitalized first letter of a paragraph) as drawing information, or as another example, the scanner analysis code must determine whether text over a colored background should be presented as text or as part of a bitmap that includes all of the background pixels. These predefined classifications may be acceptable for some users of the scanner, but other users may wish to have the ability to alter, or adjust, the sensitivity of the scanner for each classified region type, or alter the manner in which the regions are grouped, or clustered.

For example, one user might wish only to scan a page for the purposes of entering the information on that page into a word processing document with no further manipulation desired. A different user may wish to scan the same page for the purposes of manipulating the information on the page in a more sophisticated manner.

Furthermore, once a region or set of regions are analyzed and interpreted by the scanner in a particular format and presented to a user, the regions are typically non adjustable.

Generally, there are four principal classes of regions.

1. "Primitive" vs. "Composite"

A primitive region is the simplest possible representation of a region. For text, therefore, a primitive is a single word. For a table a primitive is a single cell. For a business graphic a primitive is a single graphic element or a single textual element.

A composite region is comprised of two or more region primitives. For example, a text paragraph is itself comprised of text line composites, which are comprised of text word primitives. Tables are comprised of their cell, horizontal rule, vertical rule, column and row primitives. Charts, graphs and equations are comprised of combinations of text, mathematical character, rule and drawing primitives. Boxes and cartoons are comprised of drawing, text and/or handwriting primitives.

2. "Enclosed" vs. "Containing"

An "enclosed" region is a region whose entire set of pixels fall within the boundary of another "containing" region. Important examples of enclosed/containing region combinations include text, photographs, etc., that are within containing boxes; cells within tables that have containing rules; regular or "inverse" (i.e., lighter) text over a photograph or drawing; text on business graphics; and text over shaded (often uniformly shaded, or highlighted) backgrounds.

3. "Foreground" vs. "Background"

A "foreground" region is a region intended to convey information such as text, photographs, drawings, equations, handwriting, tables, graphics, etc. A "background" region is not intended to convey information, but often intended to provide segmentation of a document or isolation of one segment of a document from another. Background regions also include such elements as the scanner lid (which may be white, black or gray); the lid of an automated document feeder, which may include non-uniform areas; and "fringing" patterns caused by the edge of the scanbed and by the three dimensional aspects of the scanned document (e.g., the sides of pages of a book that is being scanned).

4. "Hidden" vs. "Visible"

"Hidden" regions are regions that have been identified by the document analysis code but are not presented to a user. Examples include obvious "junk" regions on the document such as page folds, staple marks, punch holes and blotches; background regions that are assumed to be less important to the user than the overlying regions (e.g., text or photographs); and regions corresponding to the scanning process (e.g., the fringes along the edge of the scanner, the scanner lid, or the automatic document feeder footprint). "Visible" regions are the set of regions identified by the analysis code that are presented to the user.

These regions are presented to a user by an automated document processing (page analysis code) system contained within the scanner software and typically presented to the user during a "scan preview" operation. During scan preview the user views on a display the image that will be scanned. The information viewed includes the region types and the information contained within each region. In the past a user of a scanner has been unable to alter the information contained within each region or the format of the presentation of the regions.

SUMMARY OF THE INVENTION

The invention provides a system and method for manipulating the regions of a scanned image. The invention allows a user of a scanner to, in real time, alter or modify the contents of each scanned region by adjusting the sensitivity of the attribute contained within the region, and furthermore, allows the user to alter the grouping of the regions presented. Although not limited to these particular applications, the system and method for manipulating regions in a scanned image are particularly suited for manipulating information pertaining to scanned information. Other applications may include manipulating documents from a digital database/file system or from other digital capture devices, such as video capture systems and digital cameras.

Architecturally, the present invention can be conceptualized as a system for manipulating region information generated by a scanner comprising a document analysis software component and a user interface in communication with the document analysis software component.

In a preferred embodiment the invention allows the user of a scanner to both manipulate information pertaining to a particular region of a scanned image, and to manipulate the regions themselves.

The present invention may also be conceptualized as providing a method for manipulating region information generated by a scanner comprising the following steps. First, an image comprising at least one region is scanned. Then, a document analysis software package analyzes the scanned image. The analysis code assigns attributes to the regions and groups the regions according to a predetermined instruction. The sensitivity of each scanned region and the grouping of the regions are manipulated using a user interface in communication with the document analysis software.

The invention has numerous advantages, a few which are delineated, hereafter, as merely examples.

An advantage of the invention is that it provides to a user significantly enhanced control over a scanned image.

Another advantage of the invention is that it allows the user of a scanner the ability to manipulate (regroup) the scanned document according to preferences of the particular user.

Another advantage of the invention is that it allows the development of a wide range of user adjustable scanner options.

Another advantage of the invention is that allows simple user interaction with a list of regions created by a document analysis package, thus increasing the user task flexibility and accuracy of the analysis code.

Another advantage of the invention is that it allows region grouping information to be stored with the regions, thus eliminating the need to rerun the document analysis package with user specified changes.

Another advantage of the invention is that it does not prevent any specific region types from being "autofound" by the analysis code package.

Another advantage of the invention is the improvement in speed realized by eliminating the requirement of reanalyzing the entire scanbed each time that region information is recalculated.

Another advantage of the invention is that it permits the selective retention, by a user, of automated regions that are represented as desired, while allowing the user to selectively alter those regions that a user wishes to manipulate.

Another advantage of the invention is that the motif will match the user expectations for "realtime updating" of the regions.

Another advantage of the invention is that it is simple in design and easily implemented on a mass scale for commercial production.

Other features and advantages of the invention will become apparent to one with skill in the art upon examination of the following drawings and detailed description. These additional features and advantages are intended to be included herein within the scope of the present invention.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

The scanned region type sensitivity logic and the scanned region clustering/declustering logic of the present invention can be implemented in software, hardware, or a combination thereof. In a preferred embodiment, the scanned region type sensitivity logic and the scanned region clustering/declustering logic are implemented in software that is stored in a memory and that is executed by a suitable microprocessor (uP) situated in a computing device. However, the scanned region type sensitivity software and the scanned region clustering/declustering software, which comprise an ordered listing of executable instructions for implementing logical functions, can be embodied in any computerreadable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Moreover, while the scanned region type sensitivity logic will be illustrated hereafter with respect to adjusting the sensitivity of text, the scanned region type sensitivity logic is useful for adjusting the sensitivity of many other attributes of a scanned image, for example but not limited to drawings, photographs, equations, graphics, etc. Furthermore, the scanned region clustering/declustering logic will be illustrated with respect to drawings and large text, however it is applicable to all regions generated in a scanned image.

Figure 1:
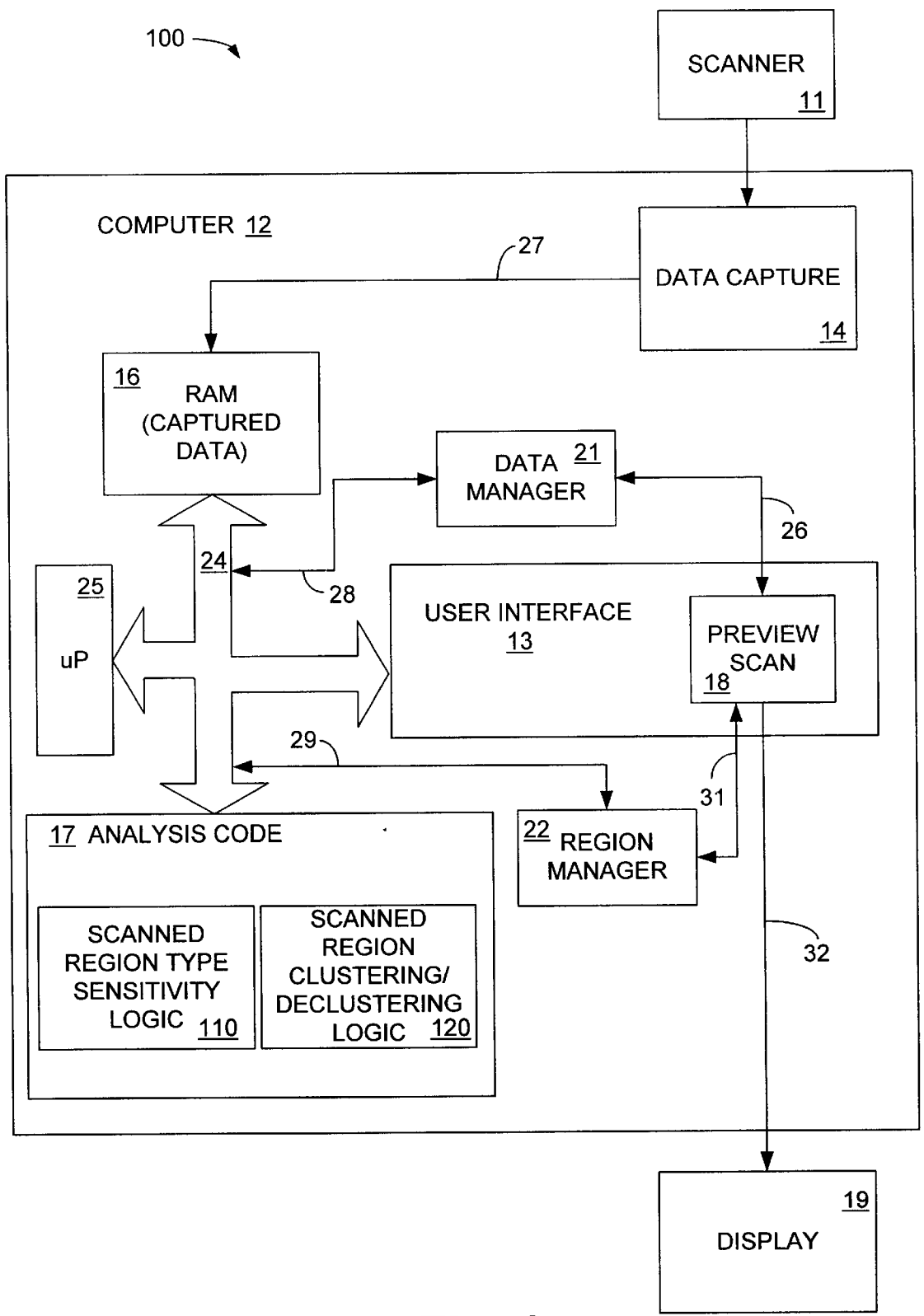
FIG. 1 is a schematic view of an exemplary scanner and computer system in which the logic of the present invention resides.

Turning now to FIG. 1, shown is a schematic view of a scanner and computer system 100 in which the scanned region type sensitivity and scanned region clustering/declustering logic of the present invention reside.

Illustratively, scanner 11 scans a document placed therein in cooperation with computer 12. Computer 12 can be any general purpose computer that is capable of connecting to and executing the software that enables scanner 11 to function. Illustratively, computer 12 is a personal computer; however computer 12 may be any computer capable of communicating with scanner 11. A scanned image is captured by data capture block 14 located within computer 12. The scanned image data is illustratively stored in random access memory (RAM) 16. RAM 16 communicates with analysis code 17, user interface 13, and microprocessor (uP) 25 over bus 24.

Analysis code 17 is illustratively the logic that operates in conjunction with scanner 11 to determine the region types, locations and statistics of the scanned image that is stored as captured data in RAM 16.

As stated above, region types may include text, photographs, equations, 15 drawings, tables, business graphics, etc. Furthermore, analysis code 17 in conjunction with uP 25 is the underlying processing engine that maintains the scanned image data. Analysis code 17 also includes scanned region type sensitivity logic 110 and scanned region clustering/declustering logic 120 of the present invention. Scanned region type sensitivity logic 110 resides within analysis code 17, which communicates with data manager 21 over bus 24 and connection 28. Data manager 21 communicates with bus 24 over connection 28 in order to access the data stored in RAM 16 in order to perform the preview scan operation or other post analysis tasks. Post analysis tasks may include, for example, printing, faxing, optical character recognition, etc. Region manager 22 communicates with bus 24 over connection 29 in order to access information pertaining to the region clustering maintained within analysis code 17 in order to draw the scanned image on display 19 during the preview scan operation.

Both scanned region type sensitivity logic 110 and scanned region clustering/declustering logic 120 are part of a probability based analysis engine, execute in uP 25 and will be discussed in detail below. User interface 13 illustratively includes preview scan block 18, which allows a user of a scanner to view the document to be scanned prior to final scanning, or otherwise, prior to sending the appropriate scanned data regions to downstream destinations (applications, storage, etc.). Preview scan 18 outputs the scanned image on connection 32 for output to a user on display 19.

Figure 2:
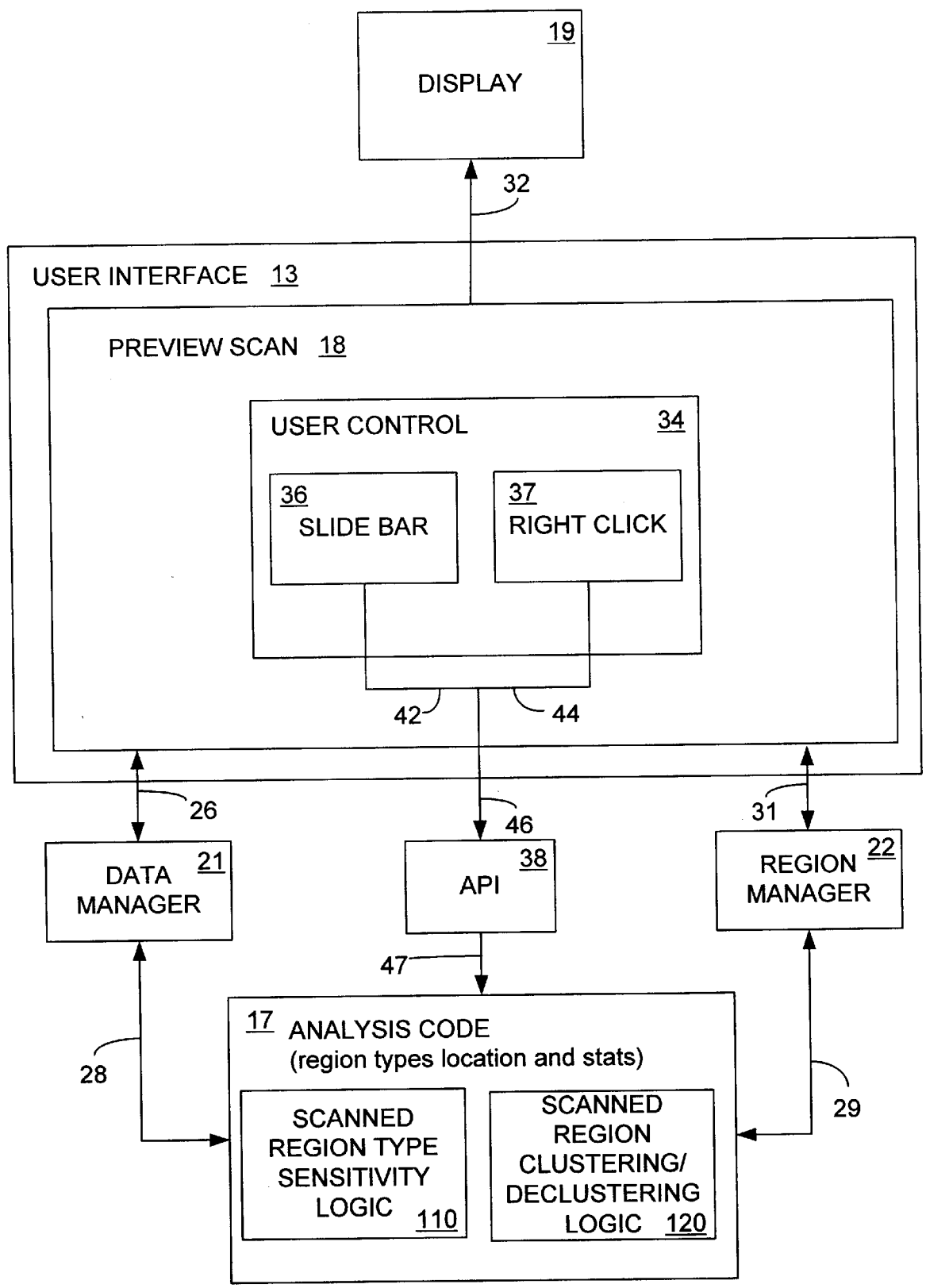
FIG. 2 is a schematic view illustrating the user interface and analysis code of FIG. 1 in which the logic of the present invention resides.

FIG. 2 is a schematic view illustrating the user interface 13 and analysis code 17 of FIG. 1, in which the logic of the present invention resides. User interface 13 includes preview scan block 18, which further includes user control 34. User control 34 illustratively includes slide bar 36 and right click element 37. Slide bar 36 may be a mode box (to be described in detail with reference to FIGS. 4A–4N), or similar user interface that allows the adjustment of an attribute of a displayed element. Right click element 37 is typically the right mouse button available on a mouse user input device supplied with personal computers. Slide bar 36 and right click element 37 will be described in further detail with respect to FIGS. 4A–4N and 6A–6E. Slide bar 36 communicates with application programming interface (API) 38 over connection 42 and right click element 37 communicates with API 38 over connection 44. Scanned region type sensitivity logic 110 and scanned region clustering/declustering logic 120 reside within analysis code 17 and contain the logic necessary to allow a user to manipulate various scanned region information. API 38 communicates with analysis code 17 over connection 47. Analysis code 17 also communicates with data manager 21 over connection 28 and with region manager 22 over connection 29.

Scanned region type sensitivity logic 110 and scanned region clustering/declustering logic 120 are accessed by the API 38 calls through analysis code 17 over connection 47. Analysis code 17 filters the correct API calls to send to either scanned region type sensitivity logic 110 or scanned region clustering/declustering logic 120. Data manager 21 communicates with preview scan 18 over connection 26 and region manager 22 communicates with preview scan 18 over connection 31 in order to display preview scan information including regions and region data to a user over display 19. Data manager 21 and region manager 22 receive information pertaining to manipulated regions from analysis code 17 over connections 28 and 29, respectively.

In use, a user will view a scanned image on display 19 while user control 34 allows the user to manipulate the displayed image according to the user's preferences. For example, a user may adjust the sensitivity of a particular attribute of a region of a scanned image by using slide bar 36 to adjust the sensitivity of the attribute. This may be accomplished, for example, by adjusting the position of a pointer contained within slide bar 36. By this adjustment slide bar 36 communicates a signal over connection 42 to API 38. API 38 sends slide bar control information to analysis code 17. This adjustment may indicate that a user wishes to change the sensitivity of a particular attribute of the displayed image and dictates the API call. API 38 communicates with analysis code 17 over connection 47 in order to update data manager 21 over connection 28 based upon the signal sent by API 38. Data manager 21 stores the data that will be displayed to the user through user interface 13 on display 19. Once a region attribute is adjusted, display 19 will display the adjusted regions to a user in real time. In this manner scanned region type sensitivity logic 110, in cooperation with analysis code 17, updates the set of regions generated by user interface 13, while eliminating the requirement that the entire scanbed be recalculated.

In similar fashion, a user may adjust the grouping of regions by using right click element 37 to adjust the clustering/declustering of the scanned regions. This may be accomplished, for example, by right clicking the mouse while the mouse pointer is positioned over a particular region that the user might wish to manipulate. Right clicking the mouse button may expose a menu of region adjustment commands such as "delete", "find", "show background", "hide background", "show foreground regions", "hide foreground regions", "form composite", "segment composite", combine enclosed and containing regions", and "separate enclosed and containing regions".

A description of each region adjustment command follows. "Delete" changes a region from being "visible" to being "hidden". "Find" brings a "hidden" region at the point clicked to being "visible". "Show background" brings a background region that was "hidden" to being "visible". "Hide background" is the opposite of "show background". "Show foreground regions" makes "visible" all of the regions over the clicked background region, which had formerly been "hidden" (so that the background region had been represented as one clustered region rather than a background with foreground elements). "Hide foreground regions" is the opposite of "show foreground regions". "Form composite" clusters together regions at the point clicked to form "composite" regions from the local "primitives". "Segment composite" breaks up a "composite" region into its primitives. "Combine enclosed and containing regions" merges region primitives within a delimiting border with their border (clustering). "Separate enclosed and containing regions" divides a border region and its enclosed primitives into separate primitive regions.

Through the aforementioned adjustment right click element 37 communicates a signal over connection 44 to API 38. This signal indicates that a user wishes to alter the grouping or clustering of regions in the displayed image and dictates the API call. API 38 communicates with analysis code 17 over connection 47 in order to update region manager 22 over connection 29 based upon the signal sent by API 38. Region manager 22 stores the data that will be displayed to the user through user interface 13 on display 19. Once the region grouping is adjusted in accordance with that described above, display 19 will display the revised region clustering to a user in real time. In this manner scanned region clustering/declustering logic 120 in cooperation with analysis code 17 updates the set of regions presented to a user, while eliminating the requirement that the entire scanbed be recalculated.

The scanned region type sensitivity logic 110 and the scanned region clustering/declustering logic 120 can be implemented using any reasonable set of algorithms for clustering and declustering segmented data and for ranking (by assigning probabilities) segmented regions for their region typedness.

For example, to illustrate a possible implementation of the scanned region type sensitivity logic 110, a regular line of text may be assigned the following probabilities (called p-values in statistics, which must sum to 1.00 for 100% overall probability): text probability=0.99, drawing probability=0.01. A larger text line (such as a heading or title) may be assigned the following probabilities: text probability=0.45, drawing probability=0.55. Now, the default representation for the second text line will be drawing, since it may have a large enough size to warrant preservation of the exact "look and feel" of the large text (rather than matching it to the closest font available, as happens in optical character recognition (OCR) packages). However, if a slider (such as in FIG. 4B) were moved far enough to favor text (e.g. the slider adds successively more "p-value" to text), then the text representation will "outweigh" the drawing presentation. For example, if the slider is moved halfway over, its weight might be 0.20, and now text=0.45+0.2=0.65, which outweighs the 0.55 for drawing, and so the region shows up as text.

A similar statistical weighting can be used for making easy the clustering/declustering decisions. For example, to illustrate a possible implementation of the scanned region clustering/declustering logic 120 consider the case wherein the user right clicks on a region and selects "Form Composite" from a pop-up menu (175 of FIGS. 6B–6D). Then, the scanned region clustering/declustering logic 120 selects the set of regions nearby the clicked point (using any reasonable clustering algorithm) to determine what type of cluster may be most appropriate to form. If a table is near the clicked point, for example, then there are likely to be predominantly text and rule primitives near the clicked point; in contrast, if a business graphic region is near the clicked point, then there is likely to be at least one large drawing region near the clicked point. As with all other regions using the underlying logic 110 and 120, the clustered region will be assigned probabilities for all of the possible region types it may be.

For example, a table cluster may be assigned the following probabilities: table p=0.45, business graphic p=0.20, cartoon p=0.15, chart p=0.10, and equation p=0.10. Since the probability (p-value) is greatest for the table, the clustered region is designated a table. This demonstrates the value of the underlying probability scheme in the preferred embodiment of this invention; for, if the classification engine (any algorithm used to process the table region) decides that the clustered region is actually not a table, it can ask the scanned region clustering/declustering logic 120 to assign the cluster to the next most likely candidate (in this case, "business graphic"). In this manner, the underlying region statistics can be used to optimize the clustering/declustering accuracy.

Figure 3:
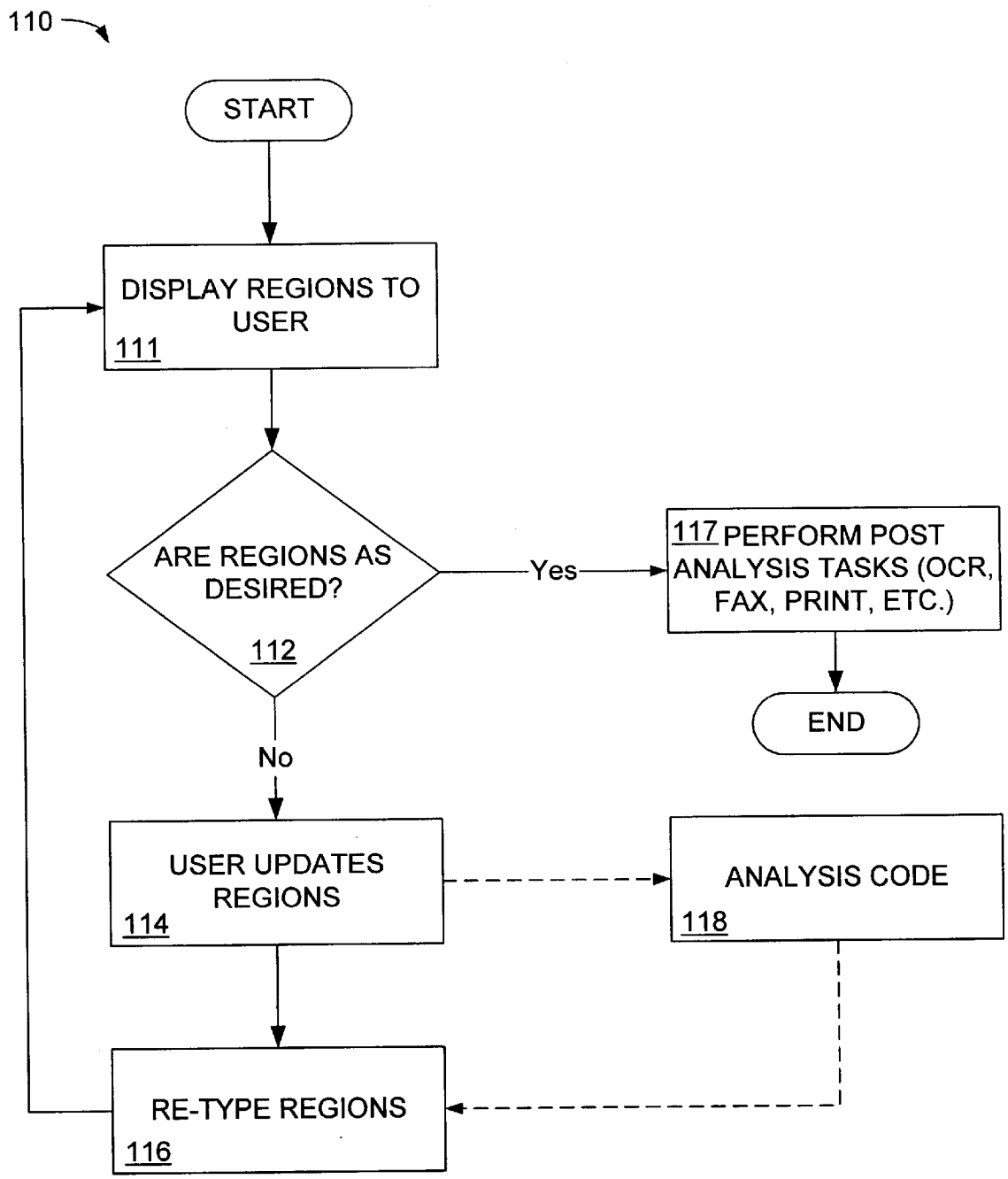
FIG. 3 is a flow diagram illustrating the operation of the scanned region type sensitivity logic of FIGS. 1 and 2.

FIG. 3 is a flow diagram illustrating the operation of the scanned region type sensitivity logic 110 of FIGS. 1 and 2. In block 111 the scanned regions are displayed to a user on display 19. The regions are displayed in accordance with the default settings applied by analysis code 17. Although analysis code 17 contains all the data pertaining to each region, only the regions generated by the default settings are displayed initially.

In block 112 it is determined whether the user is satisfied with the regions as displayed in block 111. If the user is satisfied with the display, then in block 117 post analysis tasks such as faxing, printing, optical character recognition, etc., are performed as those skilled in the art will appreciate. If, however, in decision block 112 it is determined that the regions as displayed are not to the users liking, then through the use of the scanned region type sensitivity logic 110 and slide bar 36, the user may adjust the sensitivity of any displayed region so that the desired attributes for the user's particular application are displayed.

In block 114 the user updates the desired regions by actuating slide bar 36 in accordance with that described with reference to FIG. 2. Illustratively, the user is presented with a mode box containing a slide bar 36 adjustment. The user may adjust the sensitivity of the particular attribute assigned to the particular region of interest.

Next, in block 118, analysis code 17 is accessed in order to obtain the desired region characteristics, and in block 116, the region is retyped and once again displayed to a user on display 19 with the regions updated in real time. The user may accept the revised regions and proceed or may adjust the region sensitivity again.

Figure 4A:
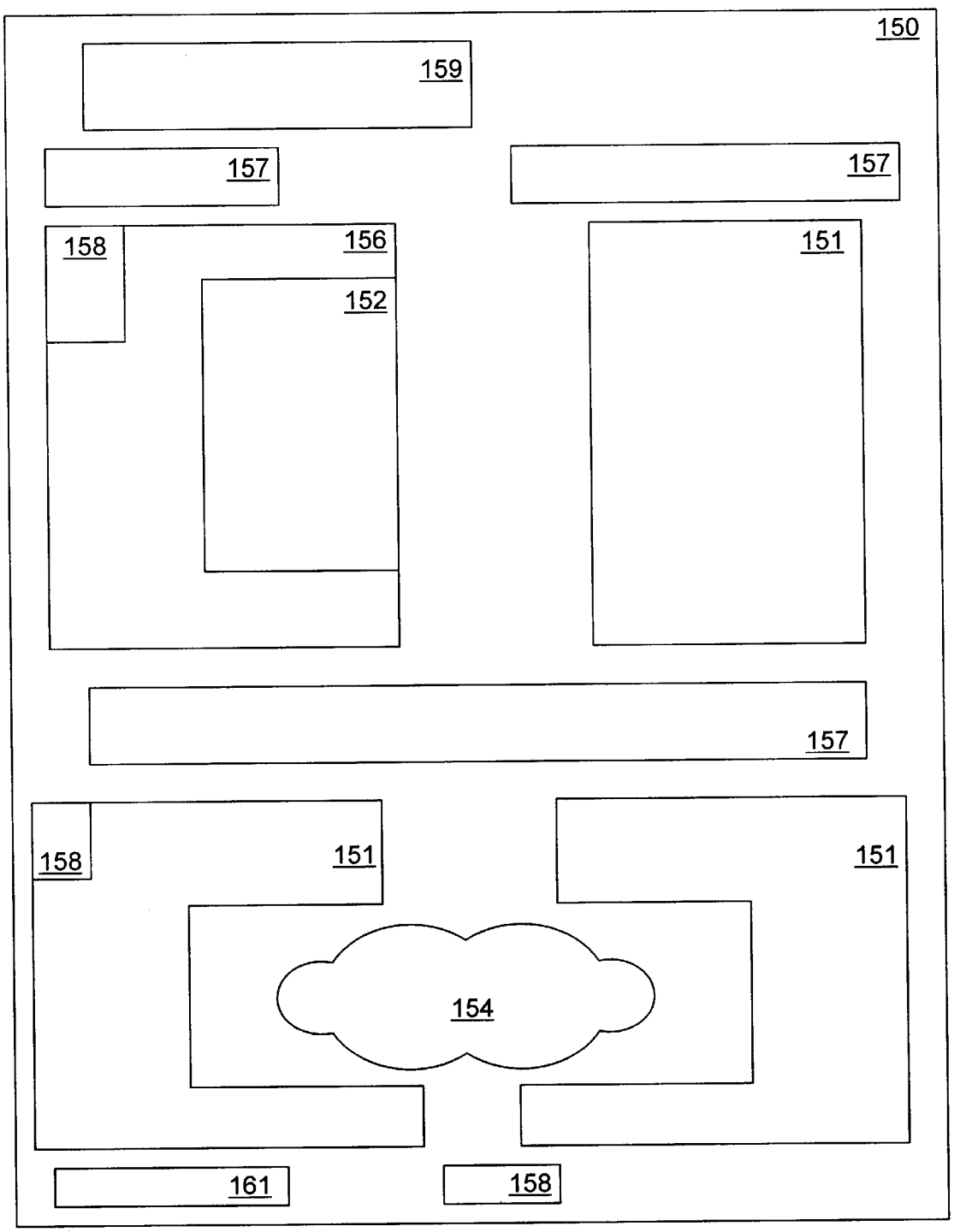
FIGS. 4A–4N collectively illustrate the results obtained through the operation of the scanned region type sensitivity logic of FIGS. 1, 2 and 3.
Figure 4B:
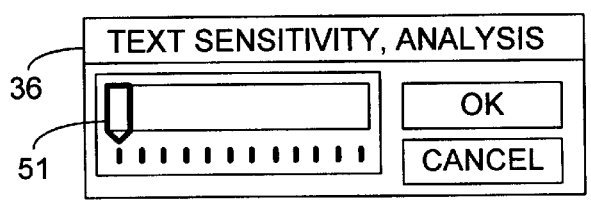
Figure 4C:
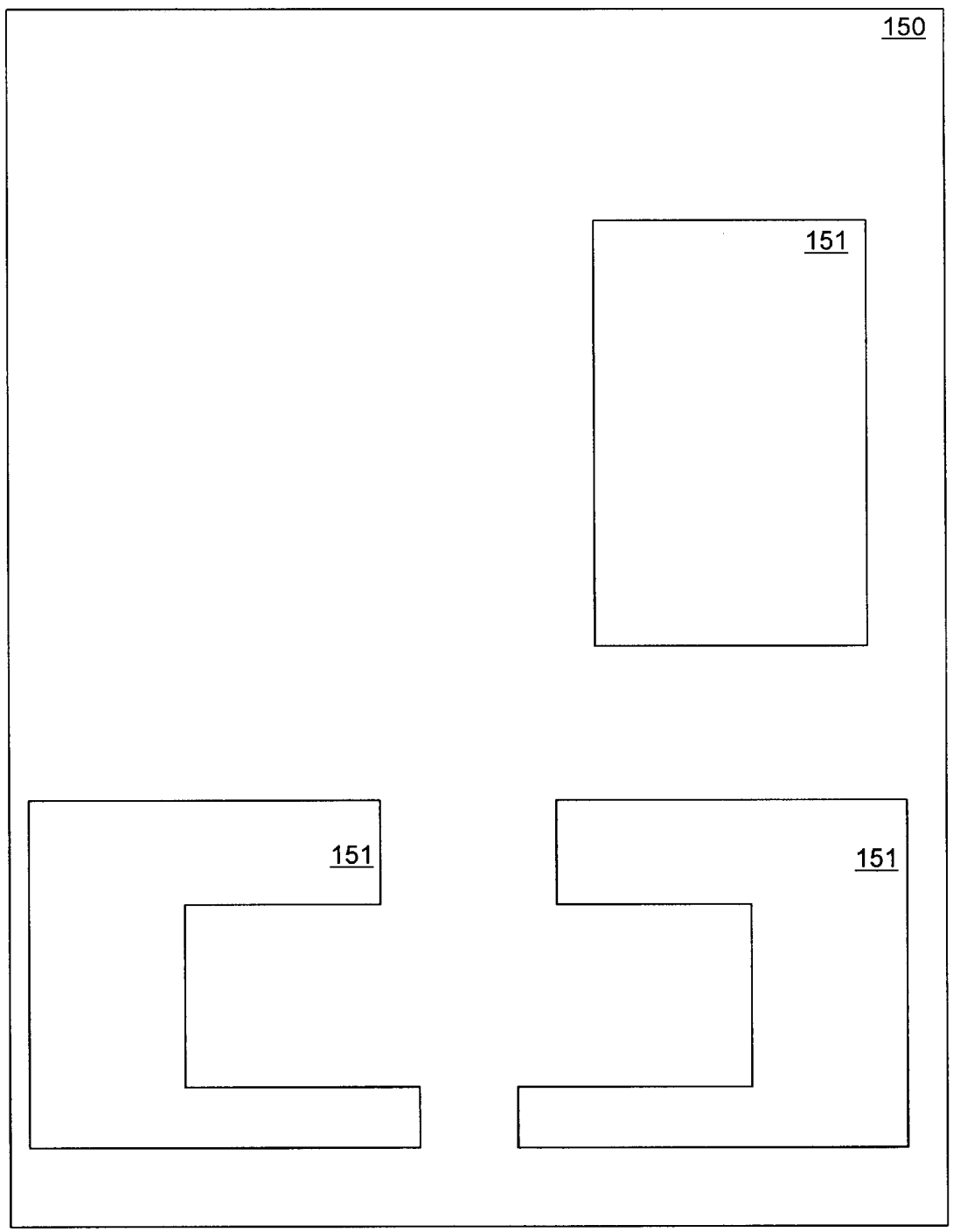
Figure 4D:
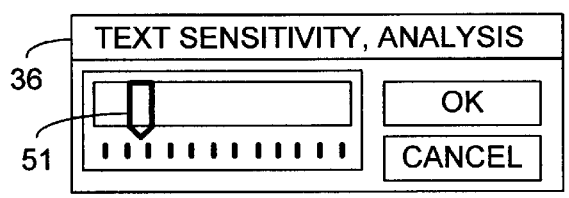
Figure 4E:
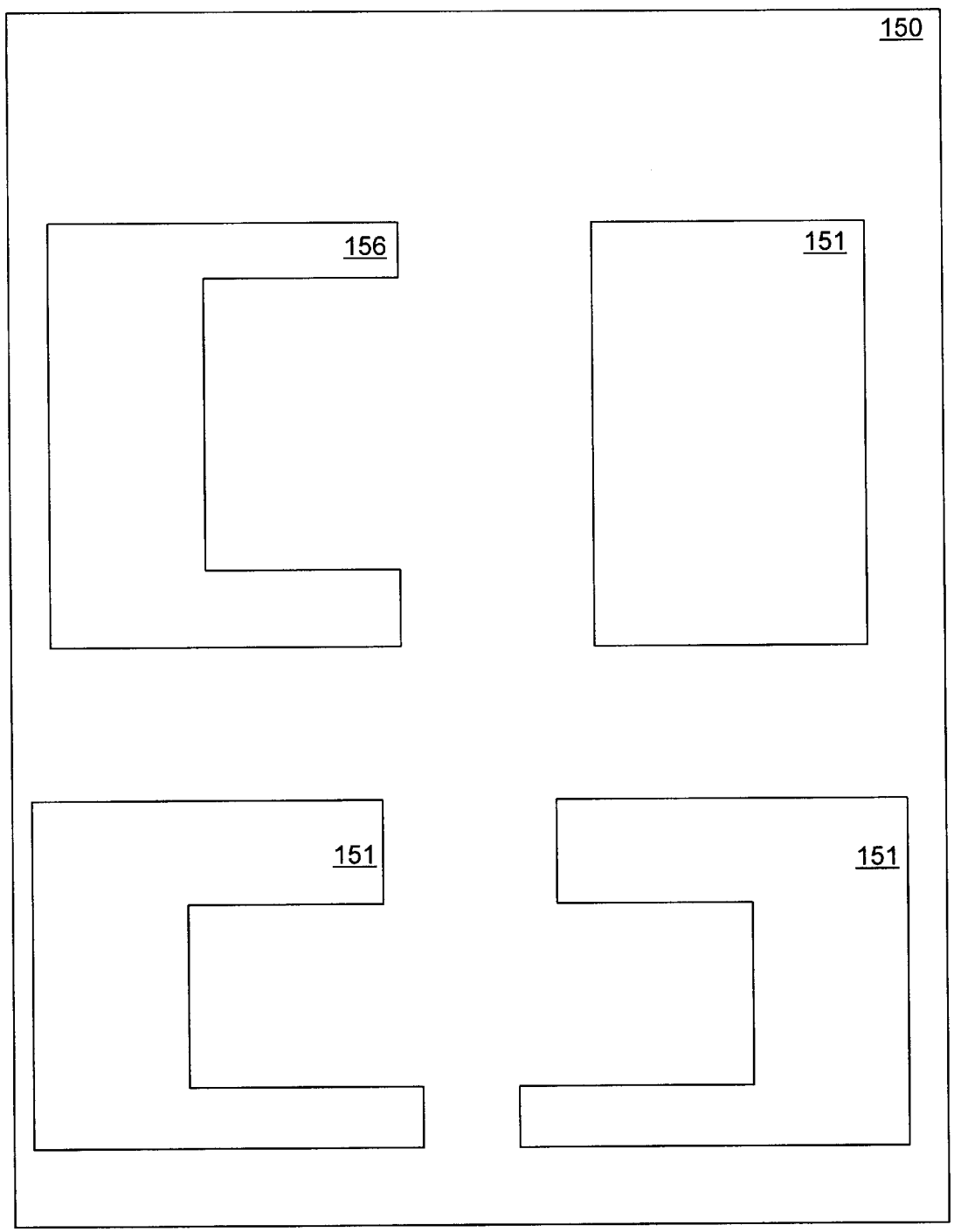
Figure 4F:
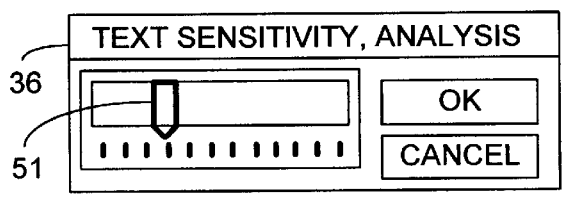
Figure 4G:
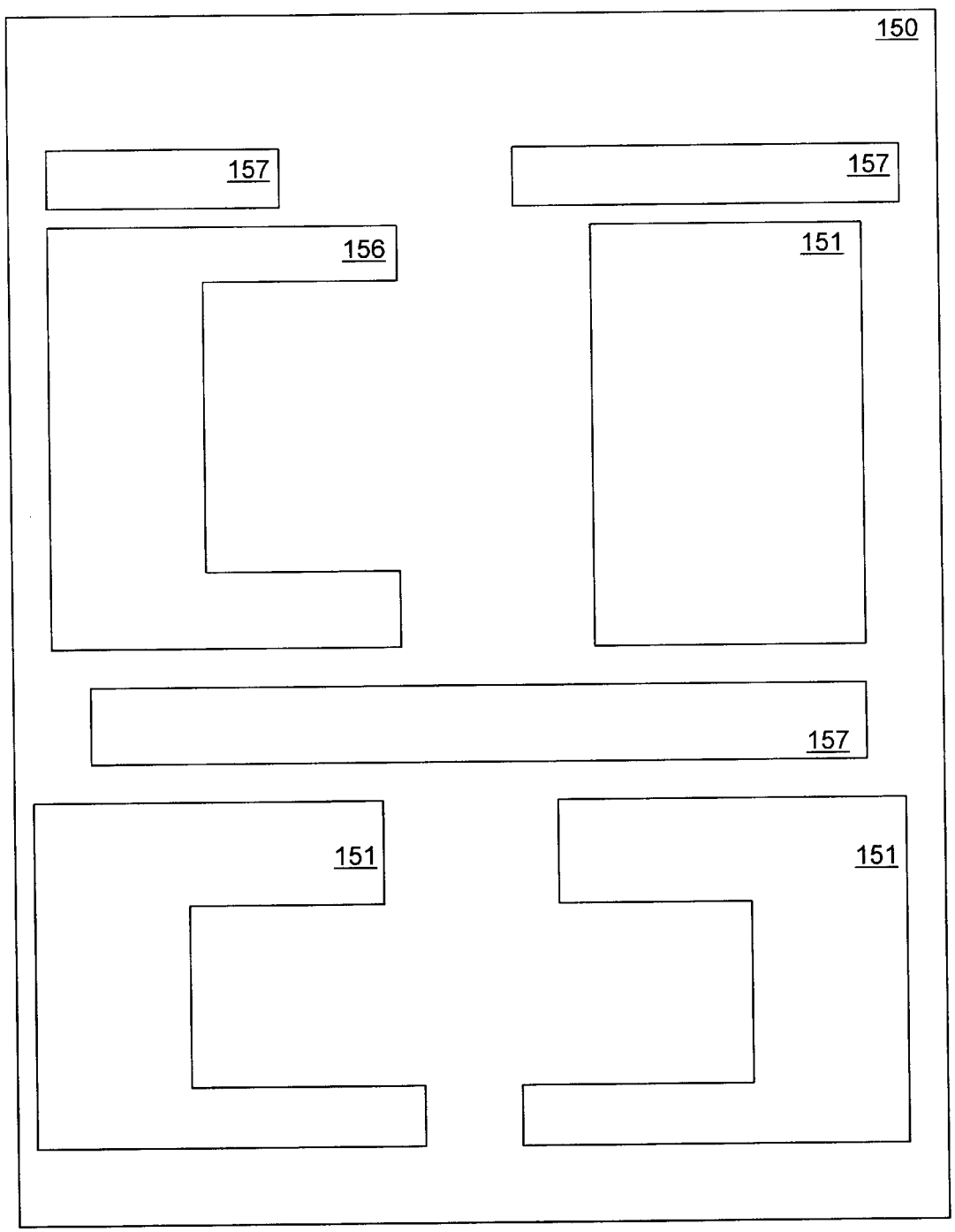
Figure 4H:
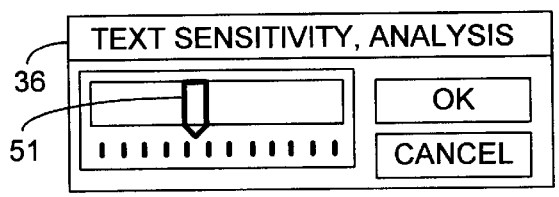
Figure 4I:
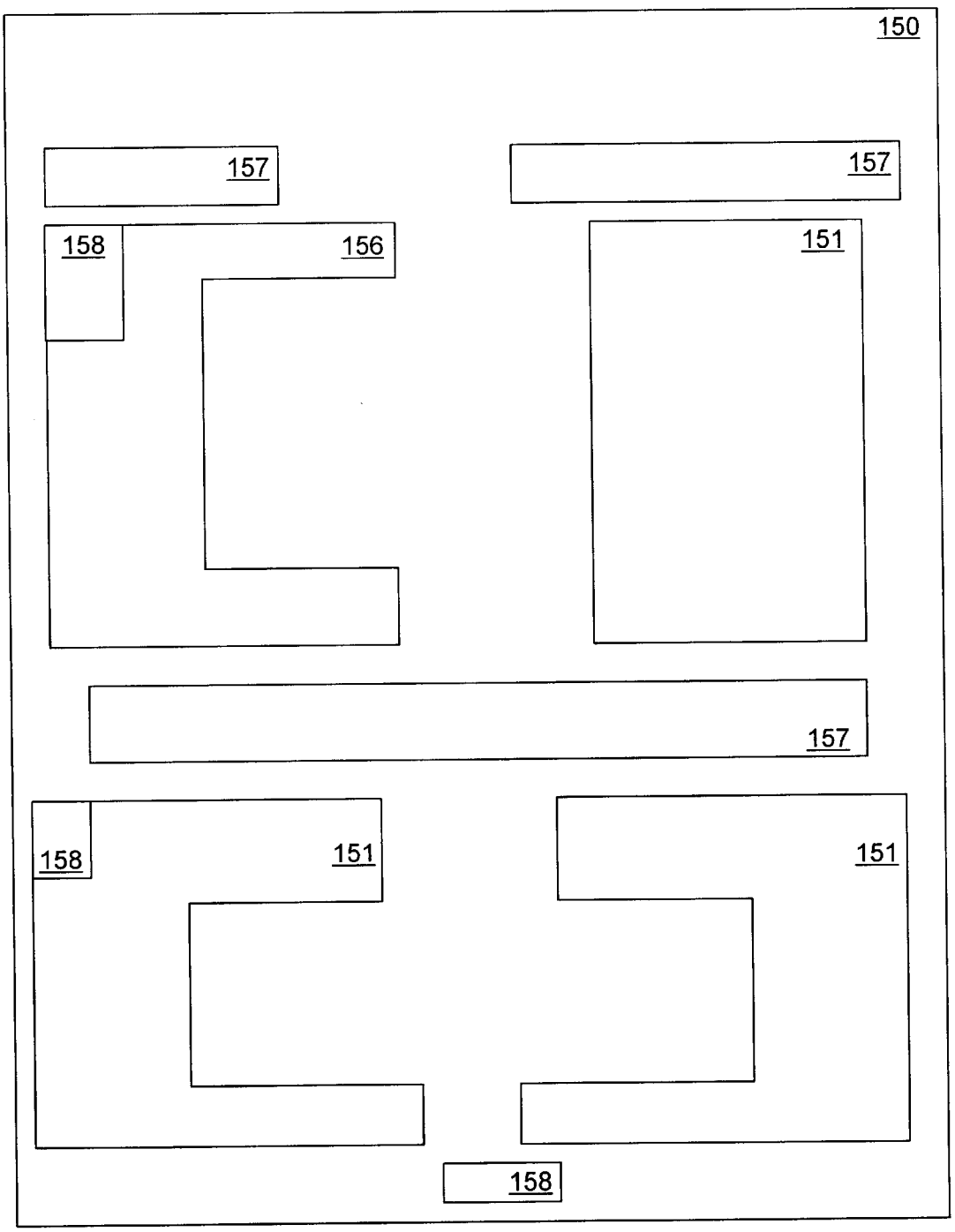
Figure 4J:
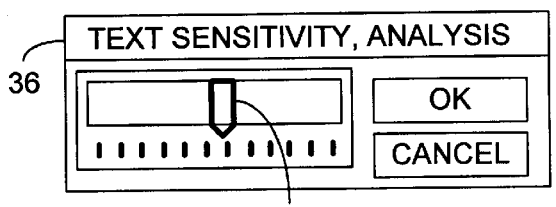
Figure 4K:
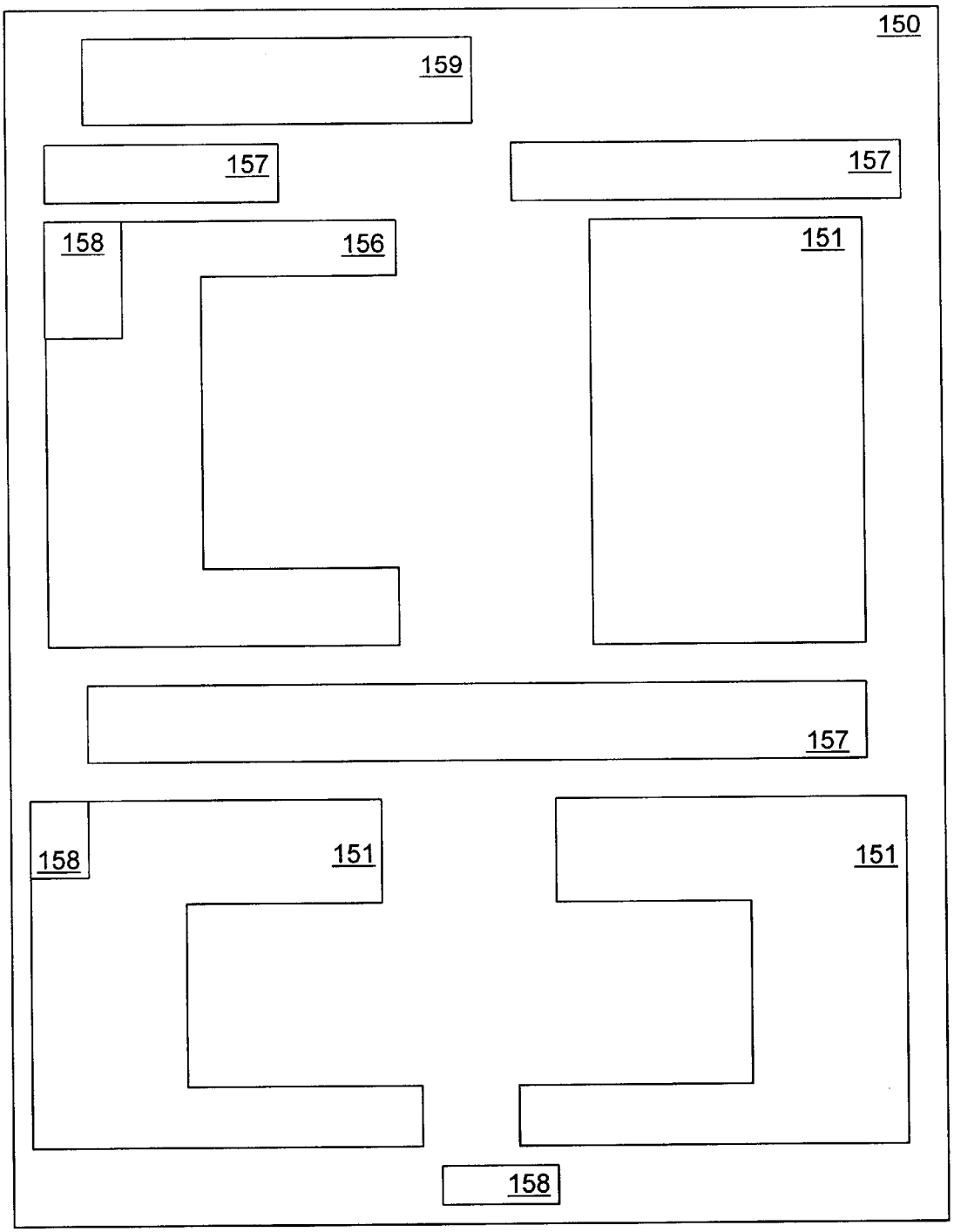
Figure 4L:
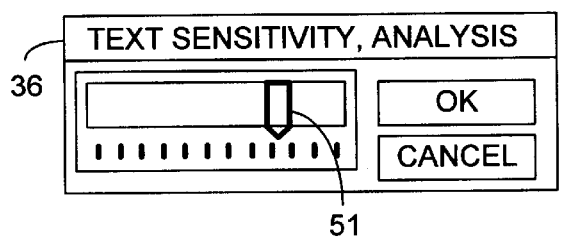
Figure 4M:
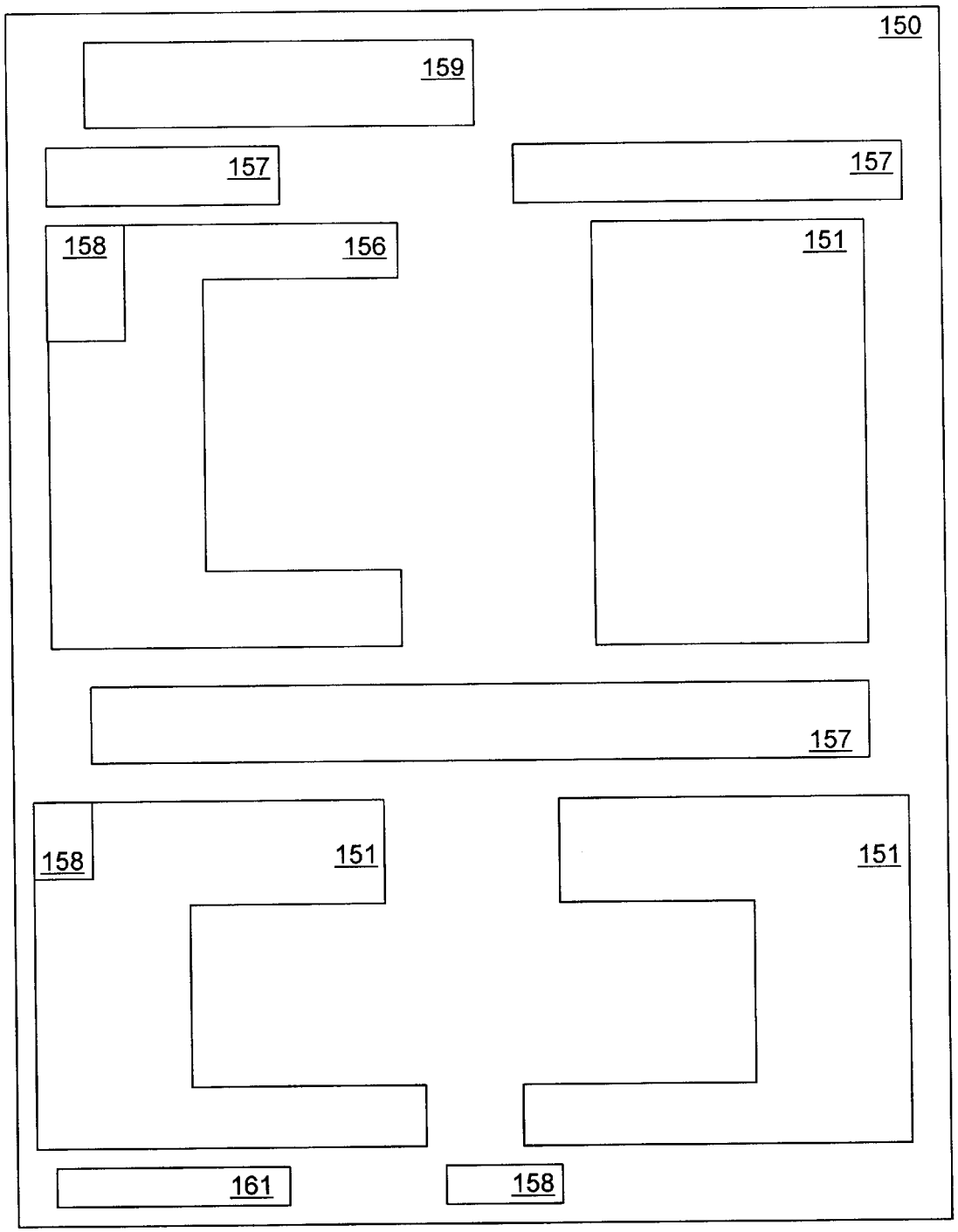
Figure 4N:
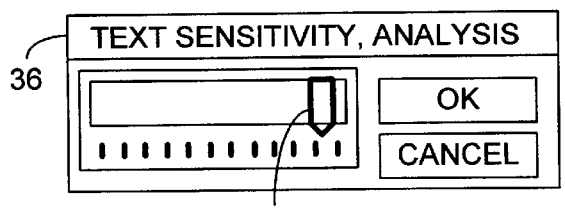

FIGS. 4A–4N collectively illustrate the results obtained through the operation of the scanned region type sensitivity logic 110 of FIGS. 1, 2 and 3. FIG. 4A is a view illustrating a representative scanned page 150. Page 150 illustratively includes text over white background 151, photograph 152, drawing 154, text over shaded background 156, larger font size text 157, special text 158, and inverted text 159. Page 150 can be, for example, a typical page in a magazine, book, or document in which multiple types of information are contained on a page.

FIG. 4B illustrates slide bar 36 having a setting illustrated by pointer 51 in which the text sensitivity is minimized. In this setting, slide bar 36 instructs scanned region type sensitivity logic 110 to display no text at all and page 150 would appear as blank.

FIGS. 4C and 4D illustrate scanned page 150 in which a minimal amount of text over white background 151 is displayed, corresponding to a minimal setting of pointer 51 of slide bar 36 (FIG. 4D). Notice that pointer 51 is adjusted slightly away from the setting illustrated in FIG. 4B, in which no text was displayed. Essentially, by increasing the sensitivity of an attribute (in this example, text) via slide bar 36, the scanned region type sensitivity logic 110 makes more regions appear as text. This corresponds to the description of the probability algorithm described with respect to FIG. 2. For example, text probability is assigned as 0.45. By moving pointer 51 of slide bar 36 to the right (thus increasing text sensitivity) additional "pvalue" is added to the text probability. In this manner more of the image will appear as text.

FIGS. 4E and 4F illustrate scanned page 150 in which the pointer 51 of slide bar 36 (FIG. 4F) is adjusted to increase further the text sensitivity. As can be seen both text over white background 151 and text over shaded background 156 is now displayed. By increasing the sensitivity using slide bar 36, additional text is displayed. This illustrates that even if analysis code 17 initially classified text as for example a drawing, by increasing the sensitivity 36 of the scanned region type sensitivity logic 110, a user may revise the attributes of regions that were not initially classified as text so as to be displayed as text. Essentially, movement of slide bar 36 tips the p-value "balance" in favor of regions being classified as text even if they originally had a higher probability of being classified as another type of region. This feature gives the user of a scanner product heretofore unavailable ability to manipulate the region sensitivity and allows a user to efficiently tailor the appearance of a scanned image for any particular application.

FIGS. 4G and 4H illustrate scanned page 150 in which pointer 51 of slide bar 36 (FIG. 4H) is adjusted to increase further the sensitivity of scanned text. As can be seen, in addition to text over white background 151 and text over shaded background 156, included at this higher sensitivity adjustment is larger font size text 157. As can be seen, by increasing the sensitivity of the scanned region type sensitivity logic 110 using slide bar 36, more and more regions that were initially classified as something other than text are caused to appear as text.

FIGS. 4I and 4J illustrate scanned page 150 in which pointer 51 of slide bar 36 (FIG. 4J) is adjusted yet higher in sensitivity. As can be seen special text 158 now appears in the scanned image. Special text 158 may be, for example, a larger font size first letter of a paragraph that may have initially been classified by analysis code 17 as a drawing due to its larger size, but, due to the increase in text sensitivity as requested by a user through input from slide bar 36, is now shown as text. Special text 158 may also be, for example, part of a logo at the bottom of page 150.

FIGS. 4K and 4L illustrate scanned page 150 in which pointer 51 of slide bar 36 (FIG. 4L) is adjusted even higher in sensitivity. This adjustment now causes scanned region type sensitivity logic 110 to display inverted text 159 as text. Inverted text 159 can be text in which the foreground and background colors have been reversed, for example, from black text with white background to white text with black background. Inverted text 159 may have initially been classified by analysis code 17 as drawing information, but is now displayed as text.

FIGS. 4M and 4N illustrate scanned page 150 in which pointer 51 of slide bar 36 (FIG. 4N) is adjusted to a maximum sensitivity causing extraneous writing 161 (which is illustratively stray handwriting on the page) to be displayed to a user as text. As can be seen, as the text sensitivity is adjusted higher, more regions are displayed as text While illustrated herein using text, the adjustment of region attributes may include all available region types including, but not limited to, drawings, photographs, equations, tables, etc.

Figure 5:
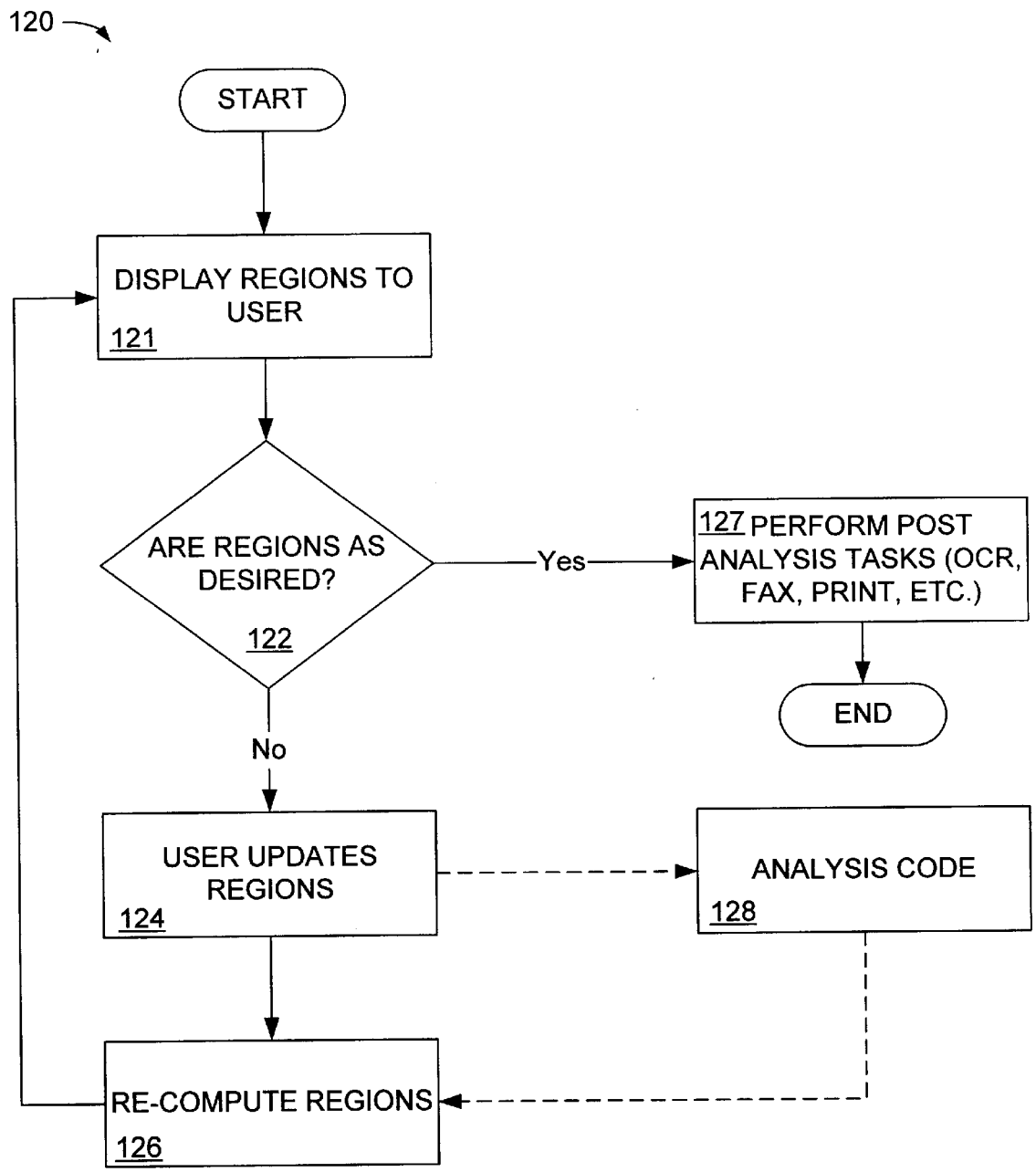
FIG. 5 is a flow diagram illustrating the operation of the scanned region clustering/declustering logic of FIGS. 1 and 2.

FIG. 5 is a flow diagram illustrating the operation of the scanned region clustering/declustering logic 120 of FIGS. 1 and 2. In block 121 the scanned regions are displayed to a user on display 19. The regions are displayed in accordance with the default settings applied by analysis code 17. Although analysis code 17 contains all the data pertaining to each region, only the region clustering generated by the default settings are displayed initially.

In block 122 it is determined whether the user is satisfied with the regions as displayed in block 121. If the user is satisfied with the displayed regions, then in block 127 post analysis tasks such as faxing, printing, optical character recognition, etc., are performed as those skilled in the art will appreciate. If, however, in decision block 122 it is determined that the regions as displayed are not as desired by a user, then through the use of the scanned region clustering/declustering logic 120 and right click element 37, a user may adjust the clustering of any displayed region so that the desired attributes for the user's particular application are displayed.

In block 124 the user updates the desired regions by actuating, for example, right click element 37 in accordance with that described with reference to FIG. 2. Illustratively, a user may right click on a particular region and be presented with a list of menu choices corresponding to available region grouping adjustment options The user may adjust the clustering, or grouping, of the regions in order to obtain the desired region clustering.

Next, in block 128, analysis code 17 is accessed in order to obtain the desired region characteristics, and in block 126, the regions are recomputed and once again displayed to a user on display 19 with the region clustering updated in real time. The user may accept the revised region clustering or may adjust the region clustering again.

Figure 6A:
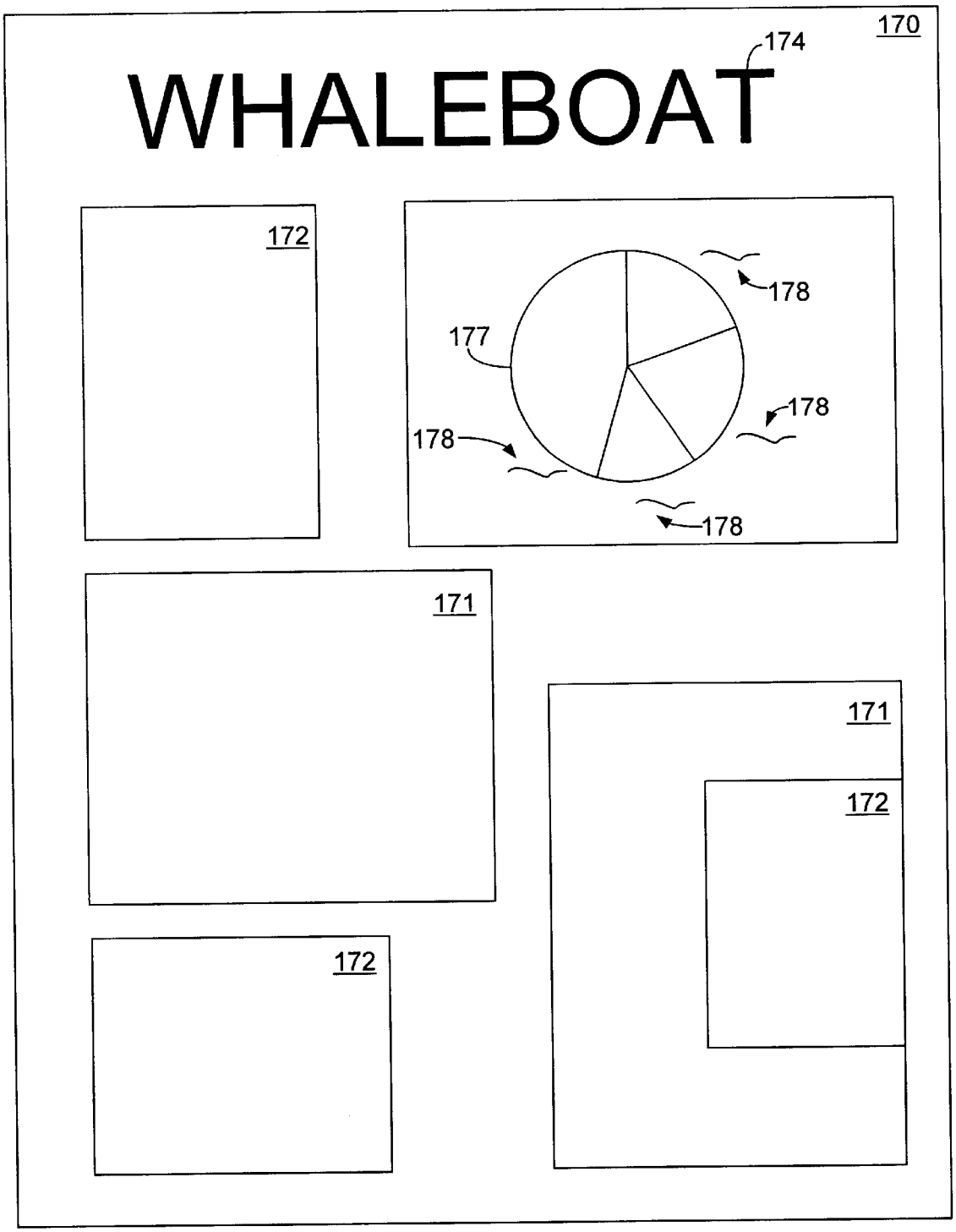
FIGS. 6A–6E collectively illustrate the results obtained through the operation of the scanned region clustering/declustering logic of FIGS. 1, 2 and 5.

FIGS. 6A–6E collectively illustrate the results obtained by the operation of the scanned region clustering/declustering logic 120 of FIGS. 1, 2 and 5. FIG. 6A is a view illustrating a scanned image 170. Scanned image 170 illustratively includes text 171, photographs 172, large text 174, business graphic 177 in the form of a pie chart, and text 178 surrounding business graphic 177.

Figure 6B:
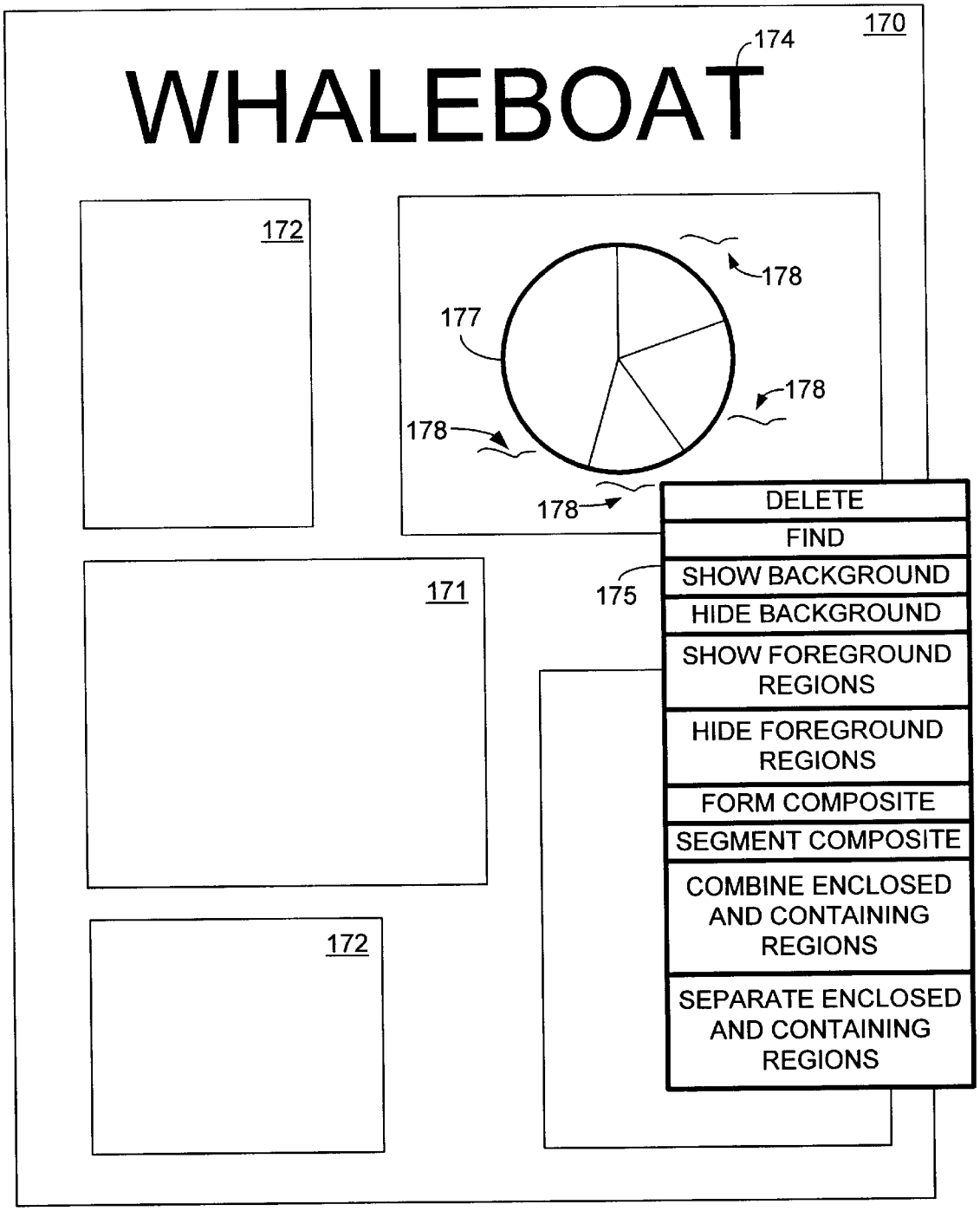

FIG. 6B is a view illustrating pie chart 177 selected by a user of a scanner by right clicking 37 (FIG. 2) through user interface 13 (FIG. 2). By right clicking, a menu 175 may be presented to a user on display 19 giving the user a selection of commands with which to manipulate the selected region or regions.

Figure 6C:
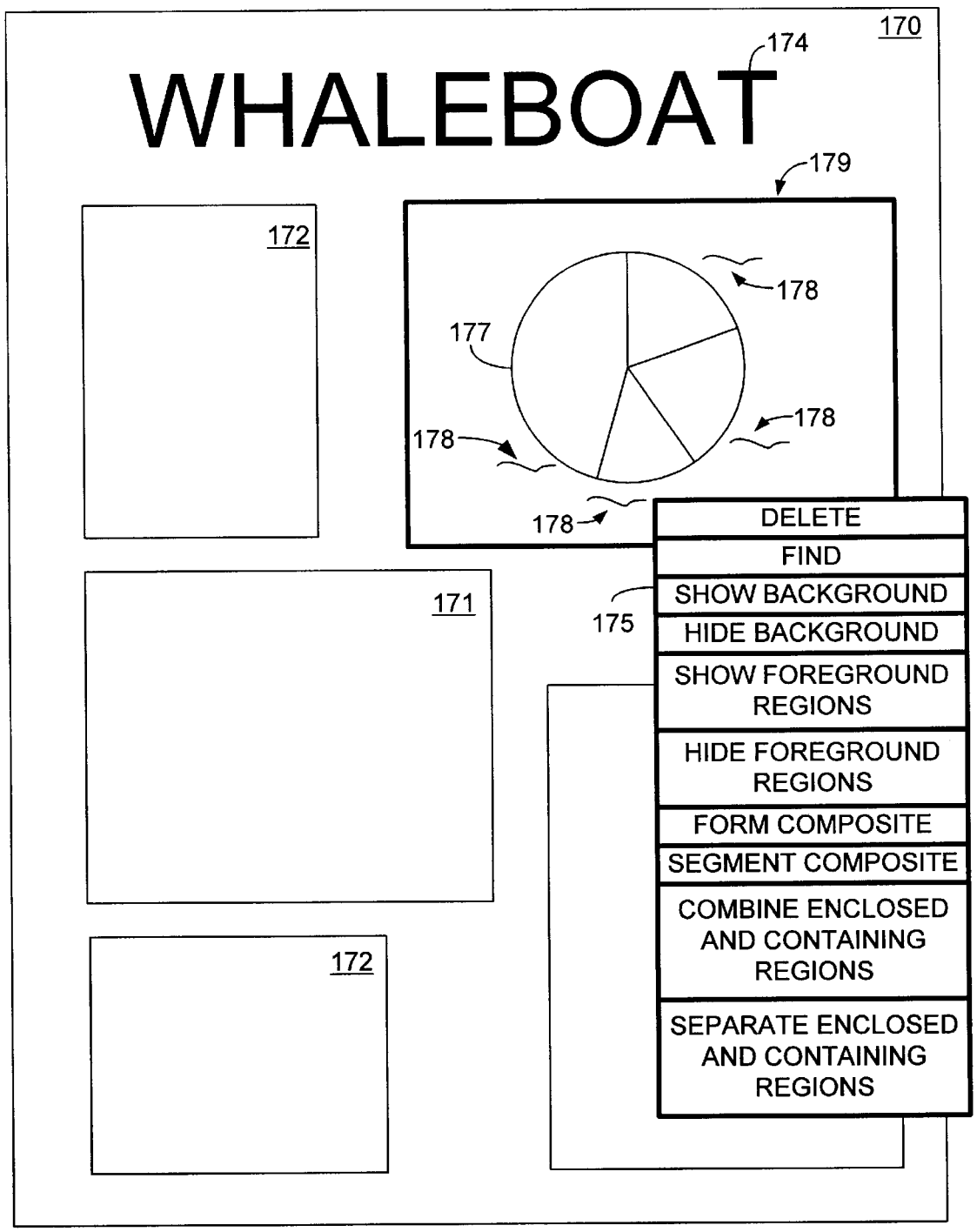

FIG. 6C is a view illustrating pie chart 177 clustered with text 178 surrounding pie chart 177. This is accomplished by a user of a scanner product right clicking 37 (FIG. 2) a mouse while the cursor is positioned over the pie chart 177. Illustratively, a user right clicks over pie chart 177, and selects menu option "form composite". By selecting "form composite" the result is as shown in FIG. 6C wherein pie chart 177 and text 178 surrounding pie chart 177 are clustered together forming region 179.

Essentially, the scanned region clustering/declustering logic 120 uses input from a user interface (37 of FIG. 2) to access analysis code 17 to group the selected regions (i.e., pie chart region 177 and text 178 surrounding pie chart 177) into a particular region that the user selects. For example, pie chart region 177 and text 178 surrounding pie chart region 177 may by regrouped into region 179 as a "business graphic", or as a new region type.

Conversely, if a user right clicks over region 179 and selects "segment composite" from the displayed menu 175, region 179 will be segmented, or declustered, resulting in separate regions 177 and 178, as previously illustrated in FIG. 6B.

Figure 6D:
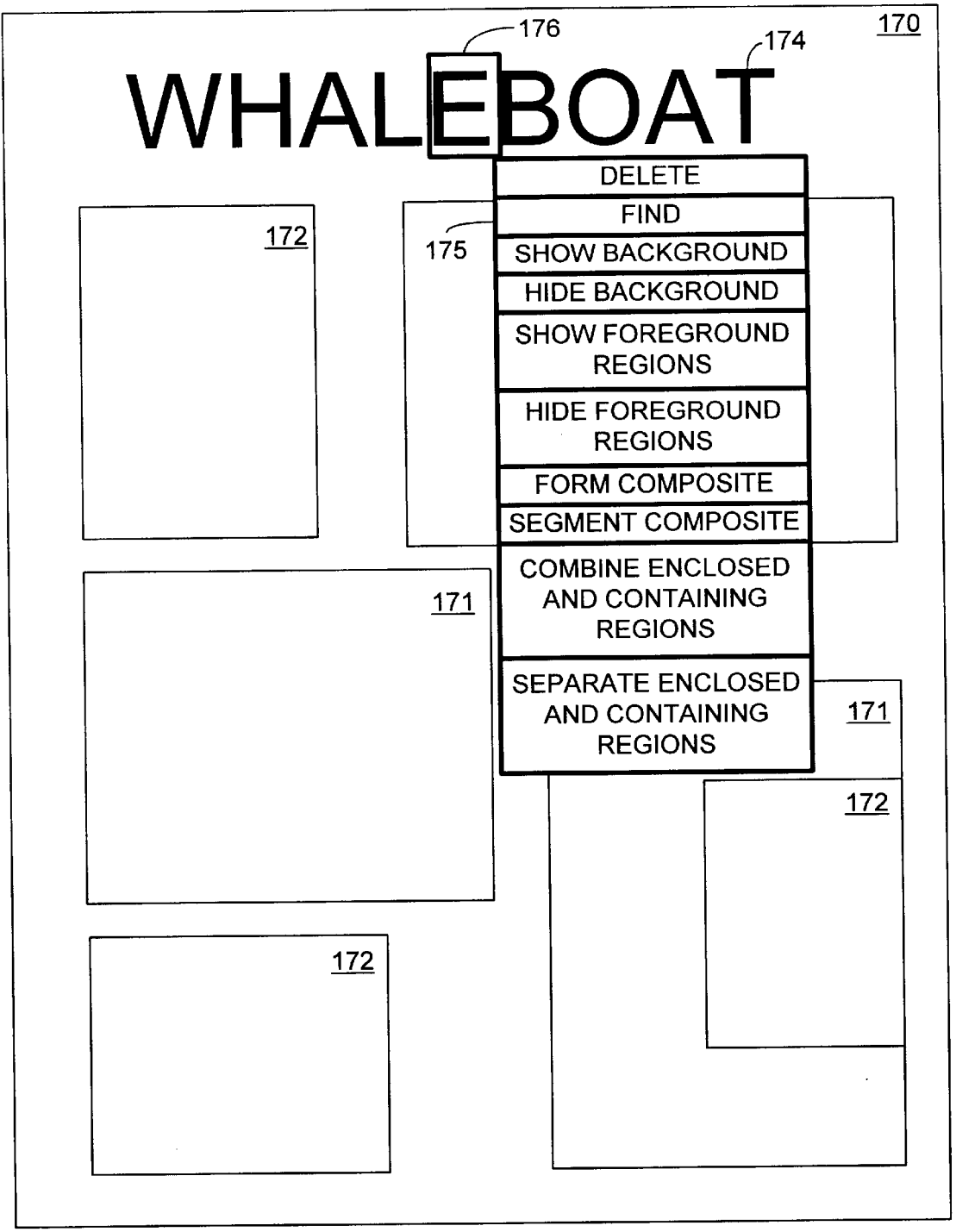
Figure 6E:
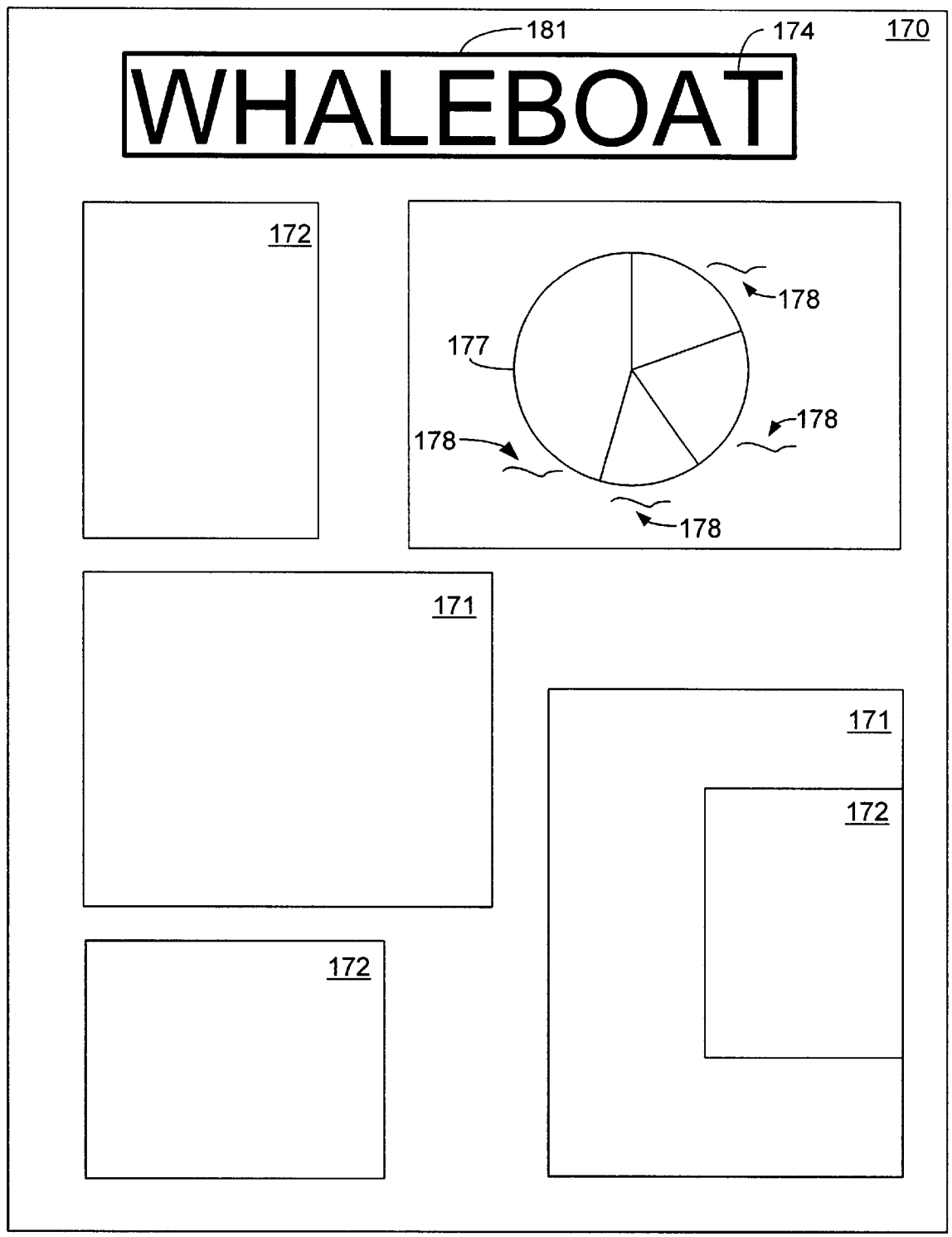

FIG. 6D is a view illustrating large text character 176 as selected by a user right clicking over the character. By enabling the "form composite" command from menu 175, exposed by right clicking over large text character 176, a user can cluster the large text into region 181 as shown in FIG. 6E. Conversely, by right clicking over region 181 and selecting "segment composite", region 181 can be declustered into regions 174 and 176.

It will be obvious to those skilled in the art that many modifications and variations may be made to the preferred embodiments of the present invention, as set forth above, without departing substantially from the principles of the present invention. For example, the system and method for manipulating regions in a scanned image can be implemented using various scanning and computing products. Furthermore, the system and method for manipulating regions in a scanned image is useful for manipulating documents from a digital database/file system or from other digital capture devices, such as video capture systems and digital cameras. All such modifications and variations are intended to be included herein within the scope of the present invention, as defined in the claims that follow.

What is claimed is:

1. A system for manipulating region information generated by a scanner, comprising:

a document analysis software component; and a user interface in communication with said document analysis software component, wherein said user interface is configured to allow the sensitivity adjustment of at least one of the attributes assigned to a predefined region in a scanned image, thereby allowing said user interface to reassign said predefined region.

2. The system as defined in claim 1, wherein said document analysis software component further comprises region type sensitivity logic.

3. The system as defined in claim 1, wherein said document analysis software component further comprises region clustering/declustering logic.

4. The system as defined in claim 2, wherein said user interface and said region type sensitivity logic allow the manipulation of the sensitivity of a region of said scanned image.

5. The system as defined in claim 3, wherein said user interface and said region clustering/declustering logic allow the manipulation of the grouping of a plurality of regions of said scanned image.

6. A method for manipulating region information generated by a scanner, comprising the steps of:

scanning an image, said scanned image comprising at least one region;

analyzing said scanned image using document analysis software;

adjusting the sensitivity of at least one of the attributes of a predefined region in said scanned image using a user interface in communication with said document analysis software; and reassigning said predefined region based on said adjusted sensitivity.

7. The method as defined in claim 6, further comprising the step of manipulating the sensitivity of said at least one region of said scanned image.

8. The method as defined in claim 6, further comprising the step of manipulating the grouping of a plurality of said regions of said scanned image.

* * * * *